United States Patent [19]

Blu et al.

[11] 4,103,707

[45] Aug. 1, 1978

[54] DEVICE FOR DISPERSING EXHAUST GASES

[75] Inventors: Gilbert Blu, Paris; Flavien Lazarre, Pau, both of France

[73] Assignee: Societe Nationale Elf Aquitaine (Production), Paris, France

[21] Appl. No.: 709,227

[22] Filed: Jul. 27, 1976

[30] Foreign Application Priority Data

Jul. 31, 1975 [FR] France ................................ 75 23892

[51] Int. Cl.[2] ................................................ F16K 19/00

[52] U.S. Cl. ....................................... 137/604; 431/89; 431/202; 431/89;202

[58] Field of Search ...................... 137/604; 23/277 C; 48/180 C

[56] References Cited

U.S. PATENT DOCUMENTS

| | | | |
|---|---|---|---|
| 3,664,818 | 5/1972 | Kramer | 48/180 C X |
| 3,736,093 | 5/1973 | Bowman et al. | 431/89 |
| 3,924,658 | 12/1975 | Lazarre et al. | 137/604 |

*Primary Examiner*—Robert G. Nilson
*Attorney, Agent, or Firm*—Brisebois & Kruger

[57] ABSTRACT

Improved device for dispersing into the atmosphere exhaust gases in the form of mixtures having a controlled composition. The device, consisting of a mixing duct provided with an axial injector extending from a supply tube for gas under high pressure, the ratio of the square roots of the areas of the sections of the duct and the injector lying between 30 and 300, is characterized in that it comprises, positioned on the supply tube of the injector, a control mechanism delivering to the injector a flow of gas under a pressure intermediate between the high initial supply pressure and the pressure prevailing in the mixing duct, the control mechanism being provided with means for fixing the maximum value of the pressure at which the gas is delivered to the injector. This improvement in devices for dispersing exhaust gases renders them more efficient when they are used to purge or evacuate the chamber which is not being supplied.

2 Claims, 3 Drawing Figures

DEVICE FOR DISPERSING EXHAUST GASES

SUMMARY OF THE INVENTION

The invention relates to an improved apparatus for producing within a finite space a mixture having a controlled composition of air and exhaust gas, especially gaseous hydrocarbons which, in the case of installations for production or treatment, must be eliminated in the absence of a commercial use for them, or for reasons of safety.

Such apparatus has been described in U.S. Pat. No. 3,924,658 and may be supplied at the pressure of the chamber to be purged or the pressure of the duct to be evacuated.

To obtain a concentration of gaseous hydrocarbon effluent below the minimum explosive limit, it is necessary to select for the injector a diameter below a predetermined limiting value, which restricts the flow of air through.

The present invention makes it possible to at least partially overcome this difficulty and obtain the highest flow possible, taking into account the value of the lower limit of explosivity and the diameter of the mixer, in other words to obtain an optimum flow.

A device according to the invention for dispersing exhaust gas into the atmosphere, and especially gaseous hydrocarbons, comprises at least one mixing duct open at two ends and a gas injector coaxial with the mixing duct and extending from a tube for supplying gas at high pressure, said supply tube opening into a chamber containing gas to be evacuated, the ratio between the square roots of the areas of the section of the duct and the injector lying between 30 and 300, the sections taken into consideration in the case of both the mixing duct and the injector being the smallest sections. The device is characterized in that it comprises, mounted on the supply tube, a control mechanism delivering to the injector a flow of gas at a pressure intermediate between the initial high pressure of the supply and the pressure prevailing in the mixing duct, said control mechanism being provided with means for fixing the value of the pressure at which the gas is delivered to the injector.

When the chamber to be evacuated is a finite volume and not supplied, a means, known per se, for determining the value of the pressure at which the gas is delivered to the injector is adjusted to a maximum value between 4 and 10 bars.

When the chamber to be evacuated is at a constant pressure the means for determining the value of the pressure to which the gas is delivered to the injector is adjusted for a predetermined value between 8 and 16 bars.

The invention will be better understood from the following description, given purely by way of illustration and example, of the circuits of devices illustrated in the following figures.

Figure 1:
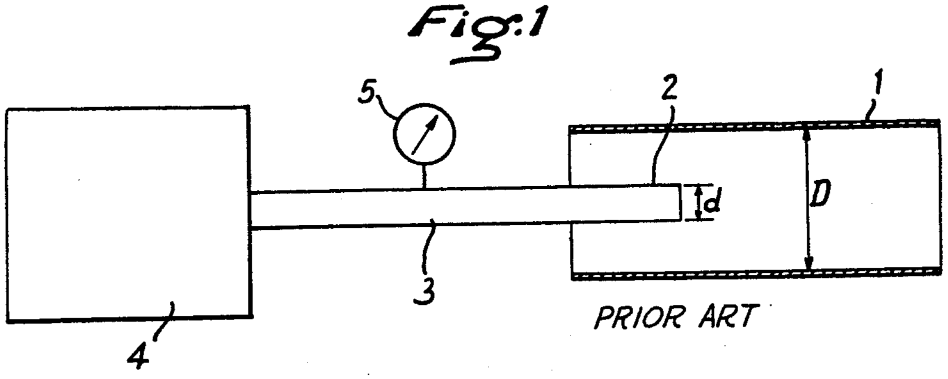
FIG. 1 shows a conventional dispersing device (prior art).

FIG. 1 is the diagram of a dispersing device of a conventional type such as the one described in French Pat. No. 73-13306. Such a dispersing device comprises a mixing duct 1, open at its two ends, and an injector 2 coaxial with the mixing duct and extending from a supply tube 3 for gas under high pressure.

The supply tube 3 opens into a chamber 4 containing the gas to be evacuated. The ratio between the square roots of the sections of the duct and the injector lies between 30 and 300, the sections considered both for the duct of the mixer and the injector being the smallest sections.

A manometer 5 gives the value of the pressure prevailing in the supply tube 3.

Figure 2:
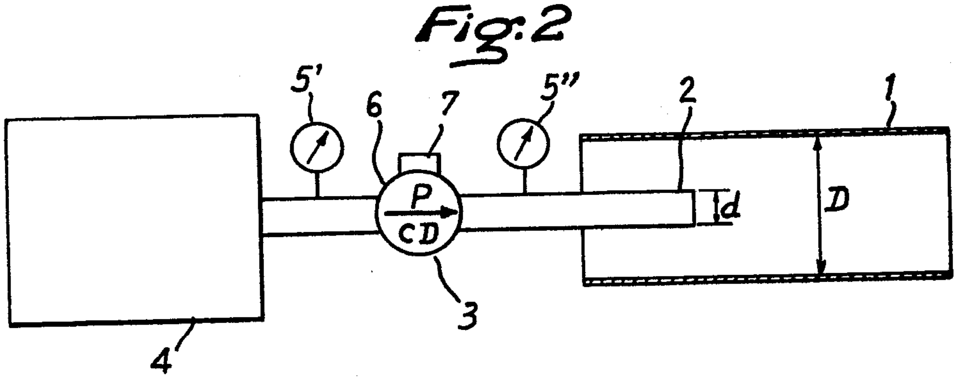
FIG. 2 shows a dispersing device according to the present invention.
Figure 3:
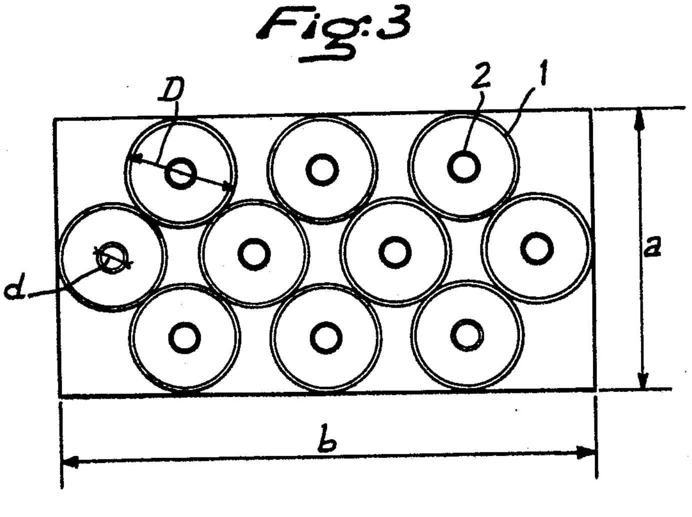
FIG. 3 is a mounting diagram.

FIG. 2 is a diagram showing a device for dispersing in accordance with the invention, including the principal components of FIG. 1, but also comprising, on the supply tube 3, a control mechanism 6 for delivering to the injector 2 a flow of gas at constant pressure, said regulating mechanism being provided with means, known per se for fixing the pressure at which the gas is delivered to the injector.

Such a control mechanism, provided with means for determining the pressure, is described in the Encyclopedia of Science and Technology, pages 702–703, City Press 1973, France.

The manometers 5' and 5'' are positioned on the tube 3 on opposite sides of the control mechanism 6.

In the conventional device (FIG. 1) with a mixing duct having given characteristics such as the diameter D, it is necessary to choose the diameter *d* of the injector sufficiently small so that the mixture has a gaseous hydrocarbon content less than the explosive limit.

In the device according to the invention (FIG. 2) the determination of an intermediate pressure between the initial pressure in the chamber 4 and the outlet pressure of the disperser makes it possible to select the diameter *d* within a broader range so as to insure the maximum yield of the installation.

The justification of the conditions of operation by the limits proposed in the choice of the intermediate pressure results from the following analysis:

A study of the parameters, the designation of which follows:

D = diameter of mixing duct;

d = diameter of injector;

P = pressure upstream of the injector;

Q = flow of gas (under standard conditions of 15° C, 1 atmosphere);

N = concentration of mixture.

It shows their inter-dependence. In effect, the tests carried out with different gases indicate that the pressure upstream of the injector controls the concentration of the mixture at the outlet of the disperser, so that, for a given concentration, this pressure varies inversely with the diameter of the injector, while the flow of the gas increases with the pressure and section of the injector. There consequently exists a relation between *d* and P for which the treatment capacity of the process is optimal.

The results of tests carried out with purified natural gas containing more than 95% methane have made it possible to establish an empirical relationship connecting N, R and P when $R = D/d$:

$$N = (1/R)(19.9\,P + 120) - 0.033\,P + 0.28 \qquad (1)$$

With another gas, for which G represents the value of the density of the gas considered as compared with that of air, a study of the conservation of the quantity of movement between the gas at the outlet of the injector and the air in the mixer makes it possible to propose a second formulation as to the concentration of gas in the mixture (the influence of the pressures and friction on the wall being ignored).

With the indices (*a*) for air (*g*) for gas:

$\mathring{m}$ = mass flow $\bar{v}$ = average speed at the operating conditions v = calculated speed at standard conditions $\rho$ = mass per unit volume q = volume of flow The conservation of the quantity of movement gives:

$$\bar{v}_g \mathring{m}_g = \bar{v}_a \mathring{m}_a$$

or $$\rho_g q_g v_g = \rho_a q_a v_a$$

$$\rho_g q_g \frac{4\, q_g}{\pi d^2} = \rho_a q_a \frac{4\, q_a}{\pi D^2}$$

$$q_g / q_a = \sqrt{\frac{\rho_a}{\rho_g}\ \frac{d^2}{D^2}} = \frac{1}{R\sqrt{G}} \qquad (2)$$

One also has $$N = \frac{q_g}{q\ \text{mixture}} = \frac{q_g}{q_q + q_a} \# \frac{q_g}{q\, a} \qquad (3)$$

from which $$\boxed{N \# \frac{1}{R\sqrt{G}}} \qquad (4)$$

Formula (4) is an approximate formula which does not take P into account. The analogy between (4) and (1) makes it possible to write:

$$N = \frac{1}{R\sqrt{G}}(\alpha\, P + \beta) - 0.033\, P + 0.28 \qquad (6)$$

or, by applying (6) to natural gas the value of $\alpha$ and $\beta$ is determined by taking 0.5625 as the value of G.

$$\frac{\alpha}{\sqrt{G}\ \text{natural gas}} = 19.9 \text{ so that } \alpha = 14.9$$

$$\frac{\beta}{\sqrt{G}\ \text{natural gas}} = 120 \text{ so that } \beta = 90$$

The following general formula may then be derived:

$$N = \frac{1}{R\sqrt{G}}(14.9\, P + 90) - 0.033\, P + 0.28 \qquad (7)$$

The relationships (1) and (7) give N within about 10%, and are valid for:

$$50 < R < 500 \text{ and } 3 < p < 30$$

In order to reduce the bulk of the dispersing device and facilitate its handling, the diameter D of the mixer has been kept less than 3000 so that:

$$d \leqq 60$$

Any combustible gas mixture has a lower limit of explosivity, (LIE). Above this concentration of gas in air the mixture becomes explosive or inflammable. As a safety measure one works with mixtures having a concentration:

N < 80% LIE (LIE = Lower Limit of explosivity)

The lower limit of explosivity of methane is 5%; the study is based on N ≦ 4%. The base formula for comparison between the different devices is:

$$P = \frac{120\, d + D\,(N - 0.28)}{19.9 - 0.033P} \qquad (8)$$

The pressure is a decreasing function of (*d*) and an increasing function of (N), and on the other hand one has:

$$Q = k\, d^2 (P - 1) \qquad (9)$$

*k* being a coefficient of proportionality, (Q) increasing with the section of the injector and with pressure.

With respect to the purging of a chamber which is not supplied and has a volume V*o* from pressure P*o* to the pressure $P^x$:

$P^x$ = pressure of mixture at the outlet of the disperser

P*o* = initial pressure in the chamber not supplied $P^x$ approximates atmospheric pressure and when $P^x$ is equal to atmospheric pressure, the time required for purging is almost infinite.

*t* = time for purging the chamber having a volume V*o* from P*o* to $P^x$.

One obtains, by the conventional method:

$$t = \frac{Vo}{k\, d^2} Ln \left| \frac{Po - 1}{p^x - 1} \right|$$

By the optimized process:

$$P^x < P < Po\ t = \frac{Vo\,(Po - P)}{k\, d^2 (P - 1)} + \frac{Vo}{k\, d^2} Ln \left| \frac{P - 1}{P^x - 1} \right|$$

The results of the comparison between the two processes are assembled in the following tables:

TABLE I

COMPARISON OF TWO PROCESSES - Gain in Time

Parametric constants: Vo = 20 m3
Po = 60 bars
k = 20 m³/j/mm2/bar
Pi = Pressure of gas delivered at the injector

| | Conventional Process | | | Improved Process | | | Gain |
|---|---|---|---|---|---|---|---|
| D mn | $t_1$mn | d mn | P.bar | $t_2$mn | d mn | P.bar | t1/t2 |
| 500 | 1,951 | 2.17 | 60 | 328 | 8.25 | 5.91 | 5.94 |
| 1000 | 488 | 4.34 | 60 | 82 | 16.49 | 5.91 | 5.95 |
| 1500 | 217 | 6.51 | 60 | 36 | 24.74 | 5.91 | 6.02 |
| 2000 | 122 | 8.69 | 60 | 20 | 32.98 | 5.91 | 6.10 |

The gain of the improved process over the conventional process is considerable, of the order of 500%, in the time of purging.

TABLE II

Influence of $P^x$ on t.

Parametric constants: D = 1000 mm
Vo = 20 m³
Po = 60 bars
k = 20 m³/j/mm²/bar
N = 4

TABLE II-continued

| Influence of $P^x$ on t. | | | |
|---|---|---|---|
| $P^x$ bar | 1.05 | 1.1 | 1.2 |
| t mn | 85 | 82 | 78 |

When $P^x$ passes from 1.05 to 1.2 bars the gain in the time required for evacuation is 8%.

TABLE III

Gain in Height of the Disperser.
Parametric constants: Vo = 20 $m^3$
Po = 60 bars
k = 20 $m^3$/j/$mm^2$bar
N = 4% and
t = 354 mn

| | d mm | D mm | Gain $\frac{\text{D.conventional}}{\text{D.optimum}}$ |
|---|---|---|---|
| Optimum process | 8.25 | 500 | 2.42 |
| Conventional process | 29 | 1 210 | |

By using the device according to the invention, diameter D is reduced by more than half.

A study of the sensitivity of N, G, D and P*o* on the optimal relationship (*d*,P), by varying the parameters within the following limits:

$$500 \text{ mm} \leqq D \leqq 3000 \text{ mm}$$

$$0.5 \leqq G \leqq 3$$

$$1\% \leqq N \leqq 5\%$$

$$25 \leqq Po \leqq 100 \text{ bars}$$

has shown that the pressure P, the maximum pressure at which the gas must be delivered to the injector lies between 4 and 10 bars.

It should be noted that, in the course of the purging of a chamber having a volume V*o*, which is not supplied, when the pressure in the chamber reaches the intermediate value P, the remainder of the operation takes place as in the conventional process from P to $P^x$. With respect to a source of gas at constant pressure, the relations (8) and (9) connect the parameters *d*, P and Q. In our field of application:

$$\frac{\delta Q}{\delta d} = kd \cdot \left[ 2(P-1) + d \frac{\delta p}{\delta d} \right] = 0$$

admits a solution *d*, the root of an equation of the second degree in *d*. The value of P and a maximum value of Q responds to this value of *d*. The relationship (*d*,P) is then a relationship for optimum operation. The results of the comparison between the two processes have been assembled in the following tables:

TABLE IV

Improved Process - Influence of N on Q
Parametric constants: D = 1 000 mm
k = 20 $m^3$/j/$mm^2$/bar

| N% | 2.5 | 3 | 3.5 | 4 | 4.5 | 5 |
|---|---|---|---|---|---|---|
| Q $m^3$j | 11,400 | 16,000 | 21,600 | 28,000 | 35,300 | 43,500 |

It will be noted that, just as when a closed chamber is being purged, the flow increases with N so that it is desirable to work as close as possible to the explosive limit.

TABLE V

Comparison of two processes - Gain in Flow
N = 4
parametric constants: k = 20 $m^3$/j/$mm^2$/bar

| D | Conventional Process | | | Optimized Process | | | GAIN |
|---|---|---|---|---|---|---|---|
| mm | d mm | P bar | Q $m^3$/j | d mm | P bar | Q $m^3$j | Q2/Q1 |
| 100 | 3.33 | 100 | 21,950 | 12.28 | 10.65 | 28,000 | 1.27 |
| 1500 | 5 | 100 | 49,500 | 18.42 | 10.65 | 63,000 | 1.27 |
| 2000 | 6.66 | 100 | 87,800 | 24.56 | 10.65 | 112,000 | 1.27 |
| 3000 | 10 | 100 | 198,000 | 36.83 | 10.65 | 252,000 | 1.27 |

It appears that the pressure upstream of the disperser is independent of D. Moreover, for a given diameter D, the optimized flow is independent of the pressure of the initial source.

The use of a regulating mechanism is even more justified by the fact that the difference ($P_o$ − P) is high. There is a gain of 7% for $P_o$ = 25 bars, and 27% for $P_o$ = 100 bars.

When the flow is known, the optimized process makes it possible to reduce the bulk of the apparatus on the ground. The conventional process requires a mixer having a larger diameter than a mixer using the optimized process.

A study of the sensitivity of the parameters N, G and D on the optimal relationship (*d*, P) by varying the parameters within the same limits as for the purging of a volume V*o* not being supplied leads to the conclusion that the pressure P, which pressure is determined as that of the gas which must be delivered to the injector, lies between 8 and 16 bars.

An example of the commercial application to the evacuation of a chamber being supplied makes it possible to bring out the principal advantages of the new apparatus.

To treat, by the process of FIG. 1, a source of gas at 150 bars with a known flow of 300 N $m^3$/per day and a concentration N = 4 requires 10 dispersing units each having a diameter $D$ = 1137 mm and a height $H$ = 5.55 m.

With the new apparatus (FIG. 2) assuring an intermediate release at 10.65 bars, 10 dispersing units are required each having a diameter of 1.015 mm and a height equal to 4.06 m.

For a group of 10 dispersers having a unit diameter D the overall surface occupied on the ground is:

$$S = a\,b = (1 + \sqrt{3})\,D.\,4D = \lambda\,.\,D^2$$

The surface occupied in the first case is 14.12 $m^2$ against 12.25 $m^2$ with the optimized process, for a gain of more than 10% in surface.

Moreover, the weight of the unit is proportional to the diameter D and the height $h$ ($h$ = 4 D); it is thus proportional to $D^2$. The gain in weight is about 25%.

The two advantages in weight and surface occupied are particularly important in installations at sea.

In a general manner, the injector must be supplied at an intermediate pressure determined to render the dispersing process more efficient, save time in the case of a purge, and save weight and bulk in the case of the evacuation of the flow of gas at constant pressure.

What is claimed is:

1. A device for dispersing a gas into the atmosphere at an optimum rate from a chamber of finite volume to be evacuated and not supplied with gas during evacuation but without exceeding a predetermined gas to air ratio, said device comprising at least one mixing duct open at its two ends and a gas injector coaxial with the mixing duct and extending into said mixing duct from a tube for supplying gas at high pressure, said supply tube leading to said chamber containing the gas to be evacuated at an initial high pressure, the ratio between the square roots of the smallest sections of the duct and the injector lying between 30 and 300, and pressure regulating means for delivering said gas to the injector at a maximum delivery pressure of between 4 and 10 bars, said delivery pressure being between said initial high pressure in the chamber and the pressure in the mixing duct.

2. A device for dispersing a gas into the atmosphere at an optimum rate from a chamber supplied with gas and at essentially a constant pressure but without exceeding a predetermined gas to air ratio, said device comprising at least one mixing duct open at its two ends and a gas injector coaxial with the mixing duct and extending into said mixing duct from a tube for supplying gas at high pressure, said supply tube leading to said chamber containing the gas at high pressure, the ratio between the square roots of the smallest sections of the duct and the injector lying between 30 and 300, and pressure regulating means for delivering said gas to the injector at a maximum delivery pressure of between 8 and 16 bars, said delivery pressure being between said high pressure in the chamber and the pressure in the mixing duct.

* * * * *